United States Patent Office 3,316,077
Patented Apr. 25, 1967

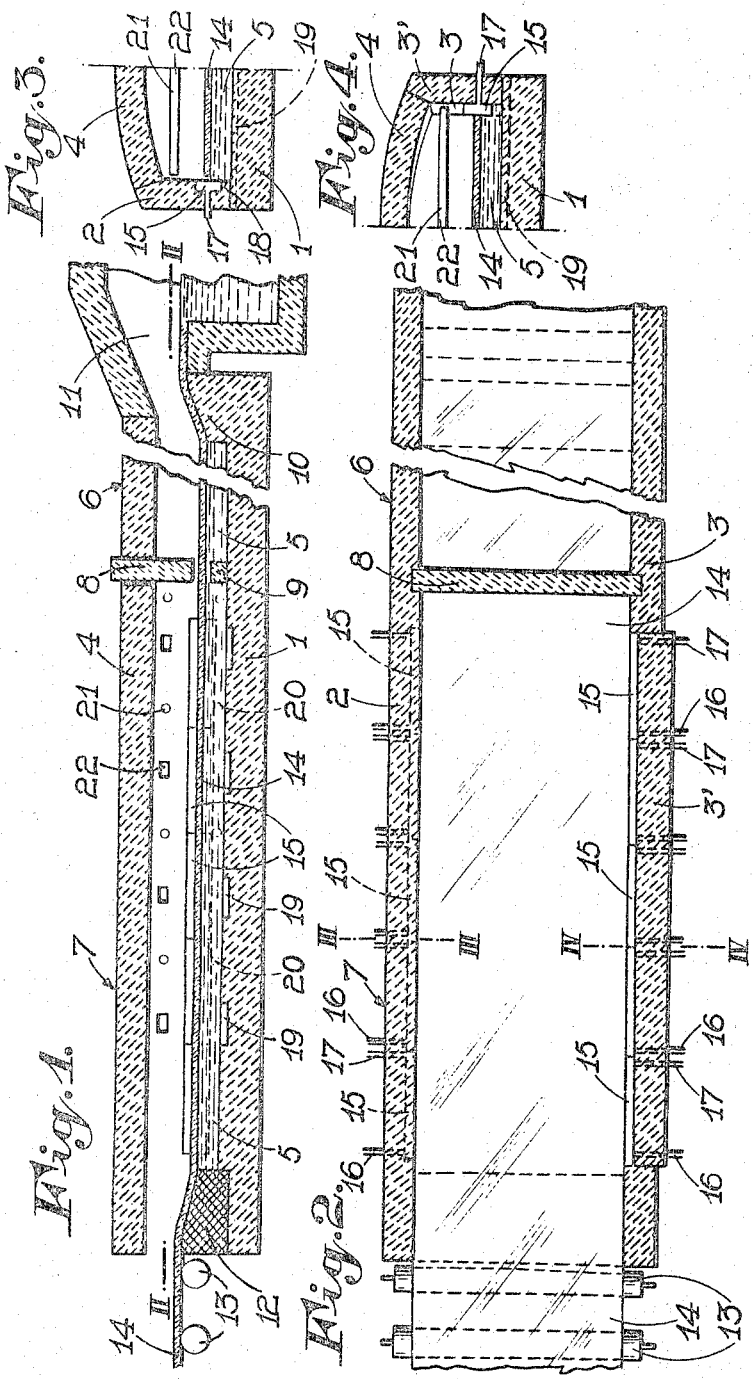

3,316,077
PROCESS AND ARRANGEMENT FOR THE CONTINUOUS MANUFACTURE OF SHEET GLASS ON A MOLTEN METAL BATH
Emile Plumat, Gilly, Belgium, assignor to Glaverbel, Brussels, Belgium, a Belgian company
Filed Sept. 3, 1963, Ser. No. 306,183
Claims priority, application Belgium, Sept. 29, 1962, 42,437
6 Claims. (Cl. 65—65)

The invention has for its object a process and an arrangement for the continuous manufacture of sheet glass in accordance with the principle which consists in spreading the glass coming from the melting tank on a molten metal bath and treating it with a view to transforming it into a continuous ribbon of solidified glass.

This principle, which was proposed at the beginning of the century, provides for the use of tin or lead or an alloy of tin with copper as molten metal bath, and offers various advantages over the processes in which glass is drawn vertically from a mass of molten glass. One of the said advantages consists in that the glass ribbon obtained on the molten metal bath is absolutely flat. In addition, the glass sheet does not show any striations or other defects such as the marking due to thermally heterogeneous air currents which act at the time of drawing on the glass sheet and which are difficult to suppress completely. The glass obtained on a molten metal bath has brilliant surfaces which have the brightness known as fire polish, and the speed of manufacture of sheet glass on a molten metal bath exceeds that which can be obtained by the vertical drawing of the glass.

Nevertheless, the use of a molten metal bath requires certain precautions. It is of course necessary to avoid the glass adhering during its solidification to the longitudinal walls of the tank containing the molten metal bath. For this reason, the bath has always been kept wider than the glass ribbon, at least over a part of its length, but this presents several disadvantages. On the one hand, the lateral portions of the bath are uncovered and exposed to oxidation. On the other hand, it is necessary to provide guide means for keeping the still malleable glass ribbon on a rectilinear path axially of the molten metal bath. The metallic oxides which are readily formed at the surface of the molten metal bath kept at a high temperature become established on the glass surface and, after cooling, represent undesirable defects and, if they are absorbed by the still fluid glass mass, they modify the composition and the physical properties of the glass or its appearance, in the case where they are only partially dissolved in the mass. It is thus necessary to provide a means for avoiding the oxidation of the molten metal bath. The means most frequently suggested consists in introducing neutral or reducing gases into the space disposed above the molten metal bath. It is evident that this measure is such as to complicate all the operations and necessitates a previous very thorough extraction of dust from the gases which are used.

The process according to the invention obviates all these disadvantages and complications. To this end, the entire surface of the molten metal bath is substantially covered by glass. At least along one part of the travel of the glass along the molten metal, the edges of the glass ribbon are then cooled with the object of avoiding the adherence of the glass to the longitudinal walls of the tank containing the molten metal bath. The glass ribbon is essentially caused to pass between cold longitudinal elements disposed in alignment with the longitudinal walls of the tank.

The arrangement for carrying this process into effect comprises juxtaposed cooling elements in the solidification zone of the glass, which elements are capable of being traversed by a cold fluid and are disposed at the level of the glass ribbon in alignment with the longitudinal walls containing the molten metal bath. These cooling elements are advantageously formed by metal chests which are preferably of rectangular section. That face of these chests which comes into contact with the glass is disposed in alignment with the longitudinal wall of the tank is immersed in the molten metal bath and extends beyond the upper face of the glass ribbon.

The cooling elements prevent adherence of the glass to the tank walls, the glass being immediately solidified along the edges of the ribbon. They guide the said ribbon during its advance along the molten metal bath and safeguard it from any contact with the ceramic material of the tank. The surface of the molten metal is covered by the glass ribbon over the full extent of the bath and is thus protected against the oxidising action of the atmosphere existing beneath the arch.

According to a first embodiment of the invention, the juxtaposed cooling elements are embedded in a horizontal groove or channel formed, in the glass solidification zone, in the longitudinal walls of the tank consisting of refractory ceramic material. In another embodiment, these elements are applied to the longitudinal walls of the tank, these walls being in the glass solidification zone and being set back in relation to the walls of the preceding zone, this setting back corresponding substantially to the depth of the cooling elements. The molten metal bath is in addition provided in the glass solidification zone with heating and cooling elements which are capable of acting on the molten metal bath and, in certain circumstances, with heating and cooling elements disposed in the closed space situated above the glass ribbon, the effect of these heating and cooling elements being combined so as to ensure the progressive cooling of the glass ribbon.

The arrangement advantageously comprises a transverse screen or baffle separating the glass solidification zone from the preceding zone in the closed space situated above the glass ribbon. It preferably also comprises a transverse barrier which is fitted into the base of the tank at a height slightly below the depth of the molten metal bath and is designed to separate the glass solidification zone from the preceding zone in the molten metal bath.

The accompanying drawing illustrates two embodiments of the invention by way of example.

FIGURE 1 is a vertical section along the longitudinal axis of an arrangement for the treatment of the glass on a molten metal bath and is shown diagrammatically;

FIGURE 2 shows two half plans of this arrangement on the line II—II of FIGURE 1, showing two different embodiments;

FIGURES 3 and 4 are transverse sections on the lines III—III and IV—IV of FIGURE 2.

The arrangement comprises a tank formed by the base 1 and the longitudinal walls 2 and 3, covered by an arch 4 and containing a molten metal bath 5 formed for example of tin or a tin alloy, such as Sn-Cu or Sn-Pb. It is subdivided into two zones 6 and 7 which are separated by a screen 8 and a barrier 9 which is raised on the base 1 and has a height slightly less than the depth of the bath 5.

The zone 6 is connected by a spout or weir 10 to the outlet from a glass furnace 11 and the zone 7 adjoins an annealing furnace by means of a ramp 12 consisting of a material which does not mark the glass, the figures only showing the rollers 13 supporting the glass in the said annealing furnace.

The zone 7, which is the solidification zone for the glass ribbon 14 advancing while floating on the molten metal bath 5 is provided with juxtaposed cooling chests 15 capable of being traversed by a cold fluid entering through the conduits 16 and leaving by way of the conduits 17. The chests 15 are made of metal and are disposed in alignment with the walls 2 and 3.

In the embodiment according to the upper part of FIGURE 2 and FIGURE 3, the chests are fitted in grooves 18 (FIGURE 3) provided for this purpose in the wall 2, whereas in the embodiment shown in the lower part of FIGURE 2 and in FIGURE 4, the chests are attached to the wall 3', which is set back in relation to the wall 3 of the zone 6. This setting back corresponds essentially to the depth of the chests 15 so that, in both embodiments, the molten metal bath is limited in both zones 6 and 7 as regards the level of its surface by two straight lines which are parallel to one another.

The solidifying zone 7 is provided with conventional heating and cooling means which are disposed either in the base, like the cooling chests 19, or in the molten metal bath, like the heating resistance 20 (FIGURE 1), or in the space closed by the arch 4, like the heaters 21 and the cooling devices 22.

The glass coming from the furnace 11 flows over the weir or spout 10 in a thin layer which preferably already has the width of the future glass ribbon or which will have reached this width before it arrives on the molten metal bath 5 in the zone 6. In this latter zone, the glass is subjected to the thermal or other treatment which is provided and, in travelling towards the zone 7, it can also be exposed to the first cooling means. In the zone 7, it is then subjected to a progressive cooling by a judicious combination of the effect of the cooling means 19 and 22 and the heating means 20 and 21, so that it passes over the ramp 12 in a still plastic condition as a whole, but having surfaces which are sufficiently solidified not to be marked by the material of the ramp.

The edges of the ribbon advance on the molten metal bath while being in contact with the refractory ceramic material of the walls 2 and 3. This contact scarcely brakes the good forward movement of the ribbon as long as the glass still has a reduced viscosity, and thus while it is still in the zone 6. However, when the viscosity increases, there is a danger of the glass adhering to the walls. On account of the rapid cooling of the edges of the ribbon by the cold chests 15 in zone 7, the edges of the ribbon almost immediately assume a lower temperature at which the glass no longer has a tendency to adhere and the ribbon advances along the chests without any appreciable resistance cause by friction. This makes it possible for the entire surface of the molten metal bath to be kept covered by the glass ribbon and for this surface to be protected against oxidation.

The invention is obviously not limited to the embodiments which have been described and illustrated by way of example, and it would not constitute any departure from the scope thereof to incorporate modifications.

I claim:

1. The process of continuously manufacturing sheet glass which comprises the steps of discharging the hot molten glass coming from a melting furnace to provide an initial ribbon of molten glass having a width equal to the width of the final glass ribbon and of the surface of a metal bath having a ribbon forming zone adjacent to the melting furnace, and feeding such initial ribbon of molten glass onto such bath surface at the entry end of said forming zone so that the glass covers the entire surface of such zone, forming the final glass ribbon of uniform width in such zone while the glass is at a temperature sufficiently high for the glass not to adhere to the side wall portions of said zone, advancing the thus formed glass ribbon without change in such uniform width thereof through an adjoining solidification zone of the metal bath in which the width of the surface of such bath is the same as that of the glass ribbon so that the latter completely covers such surface and the side edges of such glass ribbon contact longitudinal side wall portions of such solidification zone throughout the length thereof, cooling both side edges of the glass ribbon as the ribbon enters such solidification zone and substantially continuously for the major part of the length of such solidification zone, to reduce the tendency of the glass material in such side edges to adhere to other materials to such extent that the glass ribbon advances through such solidification zone without appreciable resistance caused by friction along the side edges thereof, and as the glass ribbon advances through such solidification zone, progressively cooling the body of such glass ribbon.

2. Apparatus for continuously manufacturing sheet glass comprising, in combination, a melting furnace, an elongated tank containing a bath of molten metal and including a first ribbon forming zone at the entry end thereof and a second solidification zone adjoining said ribbon forming zone, means for forming in said first ribbon forming zone a ribbon of molten glass having a width equal to the distance between the side wall surfaces of the tank that define the side edges of the surface level of the bath at the discharge end of said ribbon forming zone, said forming means comprising a conduit connecting said furnace to the entry end of said first zone and having a width at its discharge end substantially equal to said ribbon width so that the glass discharged by said conduit is in the form of a ribbon of the said width and covers the entire surface of the molten metal in said first zone, means for advancing the ribbon of molten glass from said ribbon forming zone through said second solidification zone, said solidification zone having longitudinally extending side wall portions defining the side edges of the surface level of the portion of the bath therein and disposed at the level of the glass ribbon passing through such zone, said side wall portions being spaced apart a distance similar to that between said side wall surfaces of said first zone and equal to the width of the ribbon formed in said first zone, whereby the glass ribbon will cover the entire surface of the molten bath in said solidification zone and the side edges thereof will contact said longitudinally extending side wall portions throughout their lengths, means for cooling said side wall portions in said second zone to cool the contacting edges of the glass ribbon and reduce the tendency of the glass material in such side edges to adhere to such side wall portions to such extent that the glass ribbon advances through said solidification zone without appreciable resistance caused by friction along the side edges thereof, and means in said solidification zone for progressively cooling the body of the glass ribbon as it advances through such zone.

3. Apparatus as defined in claim 2, in which each of said longitudinally extending side wall portions in said second solidification zone is formed by a plurality of longitudinally aligned, juxtaposed cooling elements having inner bath surface level defining surfaces disposed in alignment with said side wall surfaces of said first zone, and in which said cooling means supplies a cooling fluid to said elements.

4. Apparatus as defined in claim 3, in which said inner surfaces of said cooling elements have upper portions above the bath of a height greater than the thickness of the glass ribbon, and have lower portions immersed in the molten metal of the bath.

5. Apparatus as defined in claim 3, in which said cooling elements are in the form of metal chests, the exterior faces of the inner walls of such chests forming said inner bath surface level defining surfaces.

6. Apparatus as defined in claim 2, in which the top of said tank is covered by a roof, and in which said tank has at the junction of said first ribbon forming zone and said second solidification zone, a first transverse barrier extending upwardly from the base of said tank to a height slightly less than the depth of the molten metal bath, and a second transverse barrier located over said first transverse barrier and depending downwardly from the roof thereof to a place just short of the surface level of the molten metal bath.

References Cited by the Examiner

UNITED STATES PATENTS

| | | | |
|---|---|---|---|
| 2,203,288 | 6/1940 | Willets | 263—44 |
| 3,223,503 | 12/1965 | Barradell-Smith et al. | 65—348 X |
| 3,241,939 | 3/1966 | Michalik | 65—65 |
| 3,266,880 | 8/1966 | Pilkington | 65—182 |

DONALL H. SYLVESTER, *Primary Examiner.*

A. D. KELLOGG, *Assistant Examiner.*